(12) United States Patent
Kulkarni et al.

(10) Patent No.: US 11,948,160 B2
(45) Date of Patent: Apr. 2, 2024

(54) SYSTEM AND METHOD FOR AUTOGENERATED SYNTHETIC OPERATIONAL CUSTOMER SATISFACTION SCORING AND ANALYSIS

(71) Applicant: Cyara Solutions Pty Ltd, Hawthorn (AU)

(72) Inventors: Alok Kulkarni, Glen Iris (AU); Linda Chen, San Carlos, CA (US)

(73) Assignee: Cyara Solutions Pty Ltd, Hawthorn (AU)

( * ) Notice: Subject to any disclaimer, the term of this patent is extended or adjusted under 35 U.S.C. 154(b) by 310 days.

(21) Appl. No.: 17/579,205

(22) Filed: Jan. 19, 2022

(65) Prior Publication Data
US 2023/0252496 A1    Aug. 10, 2023

(51) Int. Cl.
*G06Q 30/0201*    (2023.01)
*G06Q 30/016*    (2023.01)

(52) U.S. Cl.
CPC .................. *G06Q 30/0201* (2013.01)

(58) Field of Classification Search
CPC .......... G06Q 30/0201; G06Q 30/016
USPC .... 379/265.06, 265.05, 265.01, 265.02, 242, 379/265.07, 266.1
See application file for complete search history.

(56) References Cited

U.S. PATENT DOCUMENTS

| | | | |
|---|---|---|---|
| 11,087,261 B1* | 8/2021 | Basu | G06Q 10/0639 |
| 2013/0054306 A1* | 2/2013 | Bhalla | G06Q 30/0201 |
| | | | 705/7.31 |

* cited by examiner

*Primary Examiner* — Thjuan K Addy
(74) *Attorney, Agent, or Firm* — Boon Intellectual Property Law, PLLC; Brian S. Boon

(57) ABSTRACT

A system and method for autogenerated synthetic operational customer satisfaction scoring and analysis, that generates synthetic calls and follows customer interactions across multiple channels as a single journey, which monitors synthetic calls for a plurality of failure events that may represent infrastructure related operational deficiencies that may adversely affect customer satisfaction and sentiment, which assigns a synthetic operational customer satisfaction score for each synthetic call, and which uses machine learning to optimize infrastructure configurations to improve customer satisfaction and sentiment.

6 Claims, 9 Drawing Sheets

SYSTEM AND METHOD FOR AUTOGENERATED SYNTHETIC OPERATIONAL CUSTOMER SATISFACTION SCORING AND ANALYSIS

CROSS-REFERENCE TO RELATED APPLICATIONS

None.

BACKGROUND OF THE INVENTION

Field of the Art

The disclosure relates to the field of contact center operations, and more particularly to the field of testing methods for multi-channel communication systems.

Discussion of the State of the Art

In the field of contact center operations, there is a shift toward multi-channel interactions that may use multiple different communication methods as part of a single customer experience or "journey", such as voice chat with a contact center agent while a customer is browsing a website on their computer, or combining voice and text chat to continue an interaction in-progress while switching communication methods, or other multi-channel use cases. There is also an increase in the use of virtual assistants and chat bots to assist customers when human agents are unavailable or unnecessary.

Furthermore, the current state of measuring customer satisfaction or sentiment is to deploy market research metrics or customer satisfaction surveys. However, there are some deficiencies and gaps associated with these metrics: lagging indicators, lack of specificity to actually address a root cause, and incomplete datasets because gathering data imposes additional customer effort and time, and a small percentage of customer journeys will be sampled, especially when journeys are incomplete due to an issue.

What is needed, is an automated testing solution that can test interactions across multiple communication channels, that can link channels to follow a customer journey for testing as a whole, and that supports flexible success indicators to generate a synthetic operational customer satisfaction score which can supplement live customer metrics while providing a real-time, in-production metric that shows the impact of customer experience operation issues to customer experience and their resulting sentiment

SUMMARY OF THE INVENTION

Accordingly, the inventor has conceived and reduced to practice, in a preferred embodiment, a system and method for autogenerated synthetic operational customer satisfaction scoring and analysis, that generates synthetic calls and follows customer interactions across multiple channels as a single journey, which monitors synthetic calls for a plurality of failure events that may represent infrastructure related operational deficiencies that may adversely affect customer satisfaction and sentiment, which assigns a synthetic operational customer satisfaction score for each synthetic call, and which uses machine learning to optimize infrastructure configurations to improve customer satisfaction and sentiment.

According to a preferred embodiment, a system for autogenerated synthetic operational customer satisfaction scoring and analysis is disclosed, comprising: an event database comprising at least a processor, a memory, and a plurality of programming instructions stored in the memory and operating on the processor, wherein the programming instructions, when operating on the processor, cause the processor to: store a plurality of events, each event comprising at least an event descriptor and a synthetic operational score; and an infrastructure database comprising at least a processor, a memory, and a plurality of programming instructions stored in the memory and operating on the processor, wherein the programming instructions, when operating on the processor, cause the processor to: store a plurality of infrastructure data comprising at least enterprise-specific infrastructure components and configurations, and historical infrastructure configuration information; and a customer journey test management server comprising at least a processor, a memory, and a plurality of programming instructions stored in the memory and operating on the processor, wherein the programming instructions, when operating on the processor, cause the processor to: retrieve a test case from the test database; establish a test execution environment based on the test execution configuration of the test case; execute the test script, according to the test execution configuration, within the test execution environment; and transmit, according to the test execution configuration, a plurality of synthetic calls via a plurality of communication channels comprising at least a telephony network, wherein the plurality of synthetic calls comprise a test group; and a customer journey event server comprising at least a processor, a memory, and a plurality of programming instructions stored in the memory and operating on the processor, wherein the programming instructions, when operating on the processor, cause the processor to: monitor the synthetic calls that transmitted during the customer journey test case; log an event that occurs during the synthetic call customer journey test case; retrieve the synthetic operational score associated with the logged event from the event database; aggregate the synthetic operational scores associated with a test group of customer journey test cases; calculate a synthetic operational customer satisfaction score for the test group using the aggregated synthetic operational scores; store the calculated synthetic operational customer satisfaction score in the event database; and send the calculated synthetic operational customer satisfaction score to an operations optimization engine; and an operations optimization engine comprising at least a processor, a memory, and a plurality of programming instructions stored in the memory and operating on the processor, wherein the programming instructions, when operating on the processor, cause the processor to: receive a plurality of stored and third-party data comprising at least the calculated synthetic operational customer satisfaction score and infrastructure, event log, enterprise-specific customer satisfaction metrics, test case configuration, and log server information and use machine learning to: analyze at least a portion of the received data to determine an infrastructure component which corresponds to a logged synthetic call event; and suggest an alternative infrastructure configuration to maximize customer satisfaction gain.

According to another preferred embodiment, a method for autogenerated synthetic operational customer satisfaction scoring and analysis is disclosed, comprising the steps of: retrieving a test case from the test database; establishing a test execution environment based on the test execution configuration of the test case; executing the test script, according to the test execution configuration, within the test execution environment; and transmitting, according to the test execution configuration, a plurality of synthetic calls via a plurality of communication channels comprising at least a telephony network, wherein the plurality of synthetic calls comprise a test group; monitoring the synthetic calls that transmitted during the customer journey test case; logging an event that occurs during the synthetic call customer journey test case; retrieving the synthetic operational score associated with the logged event from the event database; aggregating the synthetic operational scores associated with a test group of customer journey test cases; calculating a synthetic operational customer satisfaction score for the test group using the aggregated synthetic operational scores; storing the calculated synthetic operational customer satisfaction score in the event database; and sending the calculated synthetic operational customer satisfaction score to an operations optimization engine; analyzing at least a portion of the received data to determine an infrastructure component which corresponds to a logged synthetic call event; and suggesting an alternative infrastructure configuration to maximize customer satisfaction gain.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
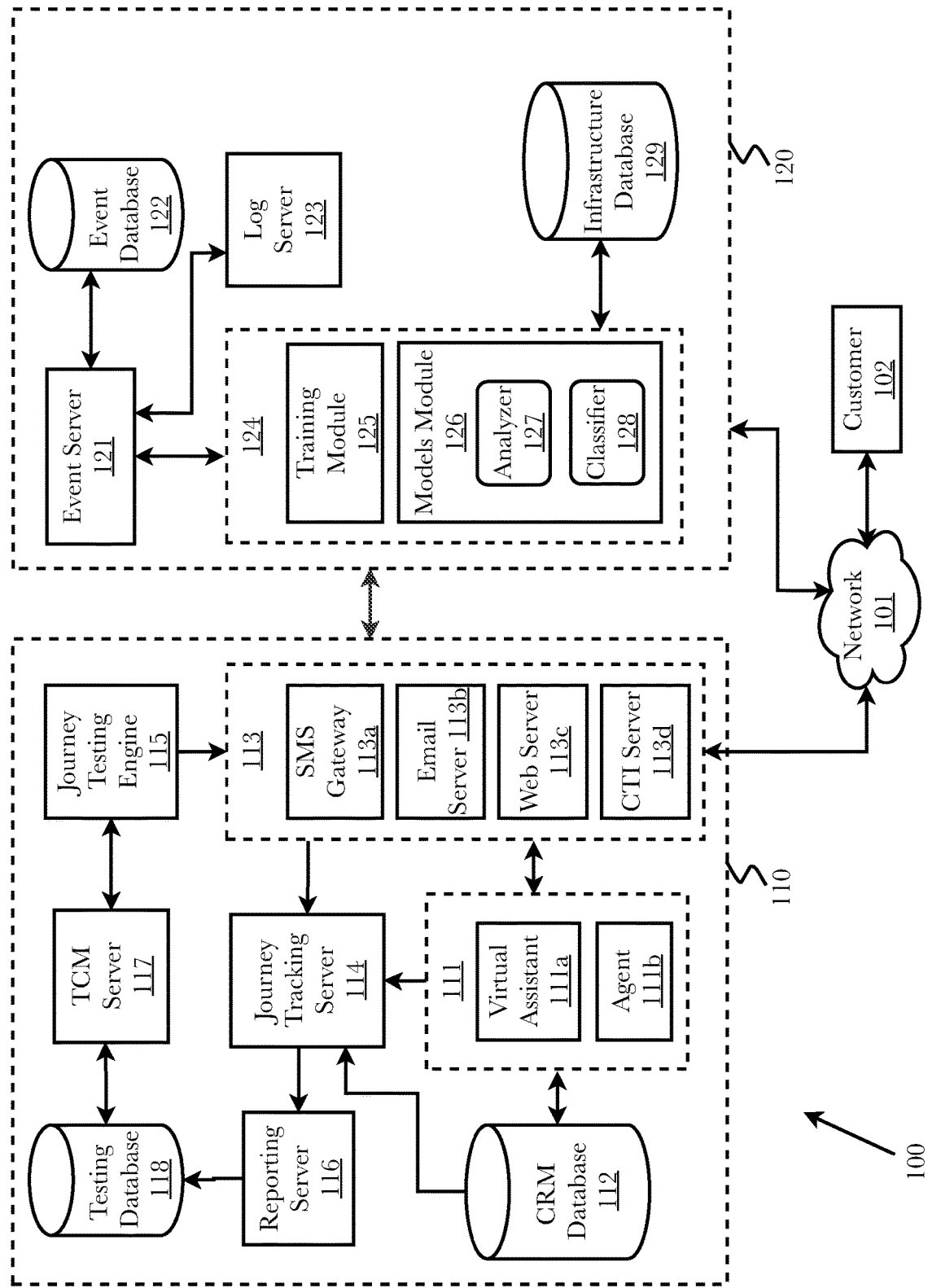
FIG. 1 is a block diagram illustrating an exemplary system architecture a system for autogenerated synthetic operational customer satisfaction scoring and analysis, according to a preferred embodiment.

The inventor has conceived, and reduced to practice, in a preferred embodiment, a system and method for autogenerated synthetic operational customer satisfaction scoring and analysis, that generates synthetic calls and follows customer interactions across multiple channels as a single journey, which monitors synthetic calls for a plurality of failure events that may represent infrastructure related operational deficiencies that may adversely affect customer satisfaction and sentiment, which assigns a synthetic operational customer satisfaction score for each synthetic call, and which uses machine learning to optimize infrastructure configurations to improve customer satisfaction and sentiment.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring nonsimultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for autogenerated synthetic operational customer satisfaction scoring and analysis system, according to a preferred embodiment. According to an embodiment, the system 100 may comprise a customer journey testing system 110 and a synthetic operational analysis system 120. According to the embodiment, a customer journey testing system 110 may comprise a customer relations management (CRM) database 112 that stores and provides customer information such as account details or historical interactions, a plurality of contact endpoints 111 such as virtual assistant (VA) software programs 111a and contact center agents 111b, and a plurality of communication channels 113 such as (for example, including but not limited to) a short message service (SMS) gateway 113a to send and receive SMS-based text messages, email server 113b to send and receive email messages, web server 113c to provide and handle interactive web-accessible interfaces such as websites or IP-based chat, and computer telephony integration (CTI) server 113d to communicate via telephone networks. These and other communication interfaces, and various combinations thereof, may be used to send and receive communications with a plurality of customers 102 via a variety of networks 101, for example to receive phone calls from a customer 102 via a public switched telephone network (PSTN) 101, or to send email messages to a customer 102 via the Internet 101, or other various arrangements and use cases. VA 111a may interact with customer 102 in place of a human agent 111b, for example to provide automated chat communication when agents are unavailable, or to provide responses to customer queries outside of business hours, or other uses. Interaction information may be read from and stored in CRM database 112, allowing VAs 111a and agents 111b to review historical data such as previous interactions with a particular customer 102 or to retrieve a customer's account information, as well as to update information and store details of a current interaction.

To provide customer journey testing, a journey tracking server 114 may be used to monitor information in CRM database 112 as well as to track interactions by monitoring VA 111a and agent 111b activities and maintaining connections to a plurality of communication channels 113. This enables journey tracking server 114 to monitor interactions regardless of the communication method or endpoint used, and provides access to historical data in CRM database 112. This information may be used by journey tracking server 114 to analyze interaction information, identifying connections between discrete portions of data such as (for example) identifying a customer and retrieving that customer's historical interaction details, or identifying topics or issues within an interaction and comparing those to recent or ongoing interactions to determine any connections. For example, a customer 102 may begin a chat session with a VA 111a via SMS gateway 113a, while simultaneously browsing self-service information on a company's website via web server 113c. Journey tracking server 114 may identify the connection between these two seemingly discrete interactions, and connect them to form a logical journey the customer 102 is involved in, wherein they are both chatting with the VA 111a and browsing the website, allowing the information from each separate interaction to be analyzed and handled as a single, larger interaction encompassing all ongoing activity with this customer. This enables analysis of customer interactions across communication channels and endpoints, bridging services to form a more complete representation of interactions.

Using the customer journey tracking capabilities provided by journey tracking server 114, it then becomes possible to provide automated testing across communication channels and endpoints, enabling testing of customer journeys as complete interactions that may comprise multiple communications, such as chat messages, phone calls, and emails. A test case management (TCM) server 117 may load a stored test case configuration from a testing database 118, and may then direct a journey testing engine 115 to execute various operations according to the test case configuration such as (for example, including but not limited to) generating and sending messages via a plurality of communication channels such as SMS text messages via SMS gateway 113a or email messages via email server 113b, or listening for response messages from contact endpoints 111 such as automated responses from a VA program 111a, and then analyzing those responses. For example, a test may comprise sending a plurality of email messages via email server 113b, listening for a response from VA 111a, analyzing the response, and determining the success state of the test based on the analysis results. For example, a generated test email may comprise a query regarding account information, and a response (if received) may then be analyzed to determine whether the correct information was provided, and based on the information provided in the response the test may be considered a success or failure. Additionally, using natural language recognition during analysis, it is possible to accept a variety of responses as "success conditions", rather than requiring a response to adhere to a particular structure or vocabulary. This may be used to accommodate more advanced VA responses (as VA programs in the art continue to advance in terms of natural interaction capabilities), or to accept responses from human agents. This can also be used to accommodate, and optionally test for, a range of potential minor errors in a response such as typographical errors or word substitution (that is, using the incorrect term for something, as may occur in a response from a human agent). For example, a test may examine whether a VA is producing an unacceptable frequency of typographical errors, or whether a human agent is using incorrect vocabulary when communicating with customers (as may indicate unfamiliarity or a need for additional training). A reporting server 116 may be used to monitor test case execution and produce reports from execution results, for example including email message fields (such as sender address, recipient addresses, header, body, and other email data fields), test case execution time (for example, tracking min/max time thresholds during test execution), what communication systems were tested, or other data that may be useful for future review. Test case reports may be stored in testing database 118 for future reference.

According to an embodiment, a synthetic operational analysis system 120 may comprise an event database 122 that stores and provides event related information, an event server 121 which monitors customer journey test cases, identifies and logs event and event metadata, and calculates a synthetic operational customer satisfaction score (SOC SS) associated with the customer journey test case, a log server 123 which monitors and records (i.e., logs) system processes and enterprise infrastructure response during execution of a customer journey test case, an operations optimization engine 124 which may comprise a training module 125 for formatting datasets and training one or more machine and deep learned algorithms in order to produce at least one or more machine learning models 126 which may be used for data analysis and data classifying tasks, and an infrastructure database 129 to store a plurality of infrastructure configurations and components. System 120 may connect with network 101 to receive, retrieve, or otherwise obtain external data from 3'd party sources, for example to retrieve hardware or software configuration data from a manufacturers website.

According to an embodiment, log server 123 may keep a detailed log of all server processes and request that occur during a customer journey test case. Event server 121 may log voice call failure events as they occur during synthetic calls, and when the server notices a problem (e.g., reoccurring and persistent failure events), it may generate and send a smart query into log server 123 asking for information about events. A smart query may comprise a type of event and a timestamp when the event occurred. Log server 123 may receive the smart query and search the server log files to identify points of failure within the infrastructure that may have led to the occurrence of the event. Log server 123 may confirm that the event occurred and which process or request failed, and then send that information back to event server 121 which may further process information such as, by sending the information to operations optimization engine 124 to analyze enterprise infrastructure configurations.

According to an embodiment, event database 122 may store event data. Event data may comprise a list of pre-determined events which may cause a voice system failure, and for each listed event an associated synthetic operational score. According to an embodiment, customer journey synthetic call events may include, but are not limited to: call dropped (by enterprise), poor voice quality (observed live voice quality, real-time mean object score and audio generation device mean object score), no issues (e.g., successful calls), missed dual-tone multi-frequency signaling or first attempt at recognition (e.g., no match), failed transfer (e.g., interactive voice response [IVR] to agent, agent to agent, etc.), ring-out (e.g., call not answered), afterhours notice (e.g., calling after office hours, needs special way using choice tags), out of date or incorrect prompts (e.g., incorrect IVR prompt), long delay in getting responses (e.g., major timeout failure), incorrect data being readout (e.g., variable data tag, CURRENCY, NUMBER, ALPHANUM, special type of no match), failed authentication, technical difficulties message (e.g., IVR technical difficulty messaging), long wait time, not understanding customer (e.g., no match, three times failure in understanding), and dead air (e.g., silence, could happen during route to the agents as well [no audio heard]). Each of these failure events and their associated synthetic operational score may be stored in an event database 122.

Synthetic operational scoring and analysis system 120 may connect to customer journey testing system 110 for bi-lateral data exchange. For example, journey event server 121 may connect to journey tracking server 114 to analyze communication channel interactions to identify and log any pre-determined customer journey events that may occur during automated synthetic calls. Conducting a plurality of synthetic calls provides useful data gathering and event scoring based on these calls. One or more identified events may be assigned a score and used as a parameter when calculating a synthetic operational customer satisfaction score for the customer journey. SOCSS may be used as a metric for measuring the consistency of call quality during a customer journey. Additionally, SOCSS can be used to quantify a systems performance and its effect on customer satisfaction. Events may be stored in an event database 122 which may at least comprise a list of events and for each event a synthetic operational score. In some embodiments, default synthetic operational scores may be initially assigned to events. Default synthetic scores may be initially determined from analyzing a plurality of test case data to determine an average (e.g., default) synthetic score. According to an embodiment, a system user (e.g., contact center manager or operator) may be able to manually define, enter, and edit the type of events and each event's synthetic operational score, for each event in event database 122. For example, during system onboarding process and setup a contact center manager could tune and/or set the synthetic score fields to the normal averages experienced at that contact center.

Events with a synthetic operational score within the inclusive range of 0-6 are categorized as detractors. Events with a synthetic operational score within the inclusive range of 7-8 are categorized as passives. Events with a synthetic operational score within the inclusive range of 9-10 are categorized as detractors. A synthetic operational customer satisfaction score may be calculated by subtracting the scored percentage of detractors from the scored percentage of promoters. For example, from a sample size of twenty calls, four calls are scored as detractors, six calls are scored as passives, and ten calls are scored as promoters. Using these exemplary values, the synthetic operational customer satisfaction score then becomes:

$$SOCSS = \left(\frac{10}{20}\right)*100 - \left(\frac{4}{20}\right)*100 = 30$$

System 100 calculated synthetic operational customer satisfaction scores may be used to indicate near real-time synthetic operational score deviations from normal operations when undergoing operational customer experience issues.

According to an embodiment, infrastructure database 129 may store a plurality of infrastructure related information including, but not limited to, enterprise-specific infrastructure configurations comprising hardware and software components, devices, and processes, as well as network architecture, and historical infrastructure configuration data. Historical infrastructure configuration data may be gathered from prior successfully optimized configurations that resulted in an increased SOC SS. Infrastructure data may be used by operations optimization engine 124 for algorithm training and as input into trained models.

According to an embodiment, a customer journey test may comprise conducting a plurality of test voice calls, also referred to as synthetic calls. For example, according to the test case configuration, a synthetic call may be conducted between a scripted "customer bot" and a virtual assistant 111a bot. A subset of the plurality of synthetic calls may be logically grouped together to form a test group. According to an embodiment, an event server 121 may be present which can actively monitor the test case execution, log any events that may occur during the duration of a synthetic call, analyze event data, calculate synthetic operational customer satisfaction scores, and capture a system configuration "snapshot" at the time an event is logged, as well as perform various other data processing tasks. According to an embodiment, all identified events that occur for a test group may be linked together and stored as a set of events, such that the test group event data may be analyzed as a single dataset. When event server 121 identifies an event, it may log the type of event and a timestamp of when the event occurred, then this data may be stored in event database 122. Event server 121 may receive, retrieve, or otherwise obtain event data from event database 122 in order to transmit, analyze, and/or process event data. For example, event server 121 may retrieve from event database 122 the synthetic operational scores associated with each of the logged events from a test group, in order to calculate a SOC SS for the test group of synthetic calls.

According to an embodiment, the calculated SOCSS may then be used by an enterprise as a synthetic market research metric to supplement its other metrics and data gathered from other sources, such as customer satisfaction surveys. Performing multiple customer journey test cases, each test case configured to conduct a plurality of synthetic calls, wherein the plurality of synthetic calls may be subdivided and logically grouped to form test groups, may allow a system 100 user (e.g., enterprise) to automatically gather a large plurality SOCSS data in near-real time. This is an improvement on current metric gathering techniques, which rely on human (e.g., customer) engagement to gather metric data and generally has a lag time of three to six months from gathering data to producing useful metrics. The large plurality of SOCSS data may then be sent to reporting server 116 which can add the SOC SS data to the customer journey test case report.

According to an embodiment, an operations optimization engine 124 may receive, retrieve, or otherwise obtain a variety of data from a plurality of sources. For example, operations optimization engine 124 may receive information from sources including, but not limited to, event data from event server 121 and event database 122, test case configuration data from testing database 118, customer data from CRM database 112, server log data from log server 123, customer journey data from journey testing engine 115, TCM server 117, journey tracking server 114, and reporting server 116, infrastructure data from an infrastructure database 129, and external data gathered from various third-party sources accessed via a suitable network 101 connection, such as the internet.

According to an embodiment, operations optimization engine 124 may comprise a training module 125 which may receive a plurality of data, pre-process the data to create a plurality training datasets, and use at least one of the plurality of training datasets to train at least one or more machine and deep learned algorithms to analyze customer journey test case result data, such as synthetic call event log data and SOCSS data, in order to generate as outputs predictions for optimizing enterprise operations to maximize customer satisfaction. According to an embodiment, operations optimization engine 124 may comprise a classifier 128 trained to classify relative differences between sets of parameters to determine what combinations of SOCSSs have greater or less influence. For example, a call that starts out bad (e.g., poor connection, improper transfer, etc.), but has a great recovery may lead to a higher SOC SS than just starting out with a great call. These types of counterintuitive results may be identified through data processing via a trained classifier 128. According to an embodiment, classifier 128 may be trained using a plurality of data including, but not limited to, calculated SOCSS data, customer satisfaction metrics and data gathered by a system user (e.g., enterprise), and historical customer information. The classifier 128 may be developed using various machine and deep learning algorithms known in the art, for example using logistic regression, k-nearest neighbors, decision trees, support vector machine, and naïve Bayes.

According to an embodiment, operations optimization engine 124 may comprise a machine or deep learned algorithm trained to analyze a variety of data related to an enterprise's infrastructure operations in order to generate as output a predicted infrastructure component which may be responsible for poor customer satisfaction scores and to suggest where to focus infrastructure improvement efforts to maximize SOCSS gain with the least effort. Such a trained algorithm may be referred to as an analyzer 127. The analyzer 127 may be trained using a plurality of data including, but not limited to, calculated SOCSS data, event data, log server 123 data, and infrastructure data. For example, training module 125 may retrieve historical infrastructure configuration data from infrastructure database 129 in order to create a training dataset that can be used to train an analyzer 127 to associate certain infrastructure configurations with higher SOCSS, such that when analyzer 127 is fed as input a system user's (e.g., call or contact center) infrastructure configuration it may be able to analyze and predict which infrastructure component (e.g., hardware, software, process, etc.) may be reconfigured to maximize SOCSS gain. The analyzer 127 may be developed using various machine and deep learned algorithms known in the art, for example using linear regression, Markov decision trees, random forest, and neural networks.

Trained and fully developed machine and deep learned algorithms may be deployed in a models module 126 which receives a plurality of data, processes the received data using the one or more fully trained machine and deep learning models, and output the results of the processing. For example, analyzer 127 may receive as input the event data and SOCSS data associated with a test group as well as any available enterprise-specific infrastructure data, analyze the data related to the event that occurred the most in order to identify a part of the contact center's infrastructure (e.g., a device, component, process, configuration, etc.) that is most likely the root cause of the event's high occurrence rate. For example, the most common event for a given test group was failed transfer and analyzer 127 could predict the most likely component that is causing the failure event is a switch positioned between an interactive voice response (IVR) device and the call agents workstations. The identified most likely part may be output and sent to reporting server 116 to add to the customer journey test case report and may also be sent to a database to be stored until further needed. An enterprise may view the results of the customer journey test by reviewing the report and can use the identified most likely part of the infrastructure as a starting point for making enterprise specific adjustments to its own infrastructure and to support root cause analysis. In this way, the calculated SOCSS may be used to identify operational deficiencies in an enterprise's infrastructure which may lead to lower customer satisfaction levels or scores.

According to an embodiment, an enterprise user (e.g., a call or contact center) may give permission for synthetic operational scoring and analysis system 120 to test different infrastructure configurations and automatically change the configuration based on the calculated SOCSS and the analyzer output. In this way, system 120 can provide active monitoring of operational processes and root cause analysis (RCA) could be performed if SOCSS starts dropping. When RCA shows an emerging problem, the infrastructure may be automatically reconfigured to minimize the impact of the emerging problem.

Operations optimization engine 124 output may be stored in a database for future use and may also be sent to reporting server 116 where the output may be added to a customer journey test case report.

Detailed Description of Exemplary Embodiments

Figure 2:
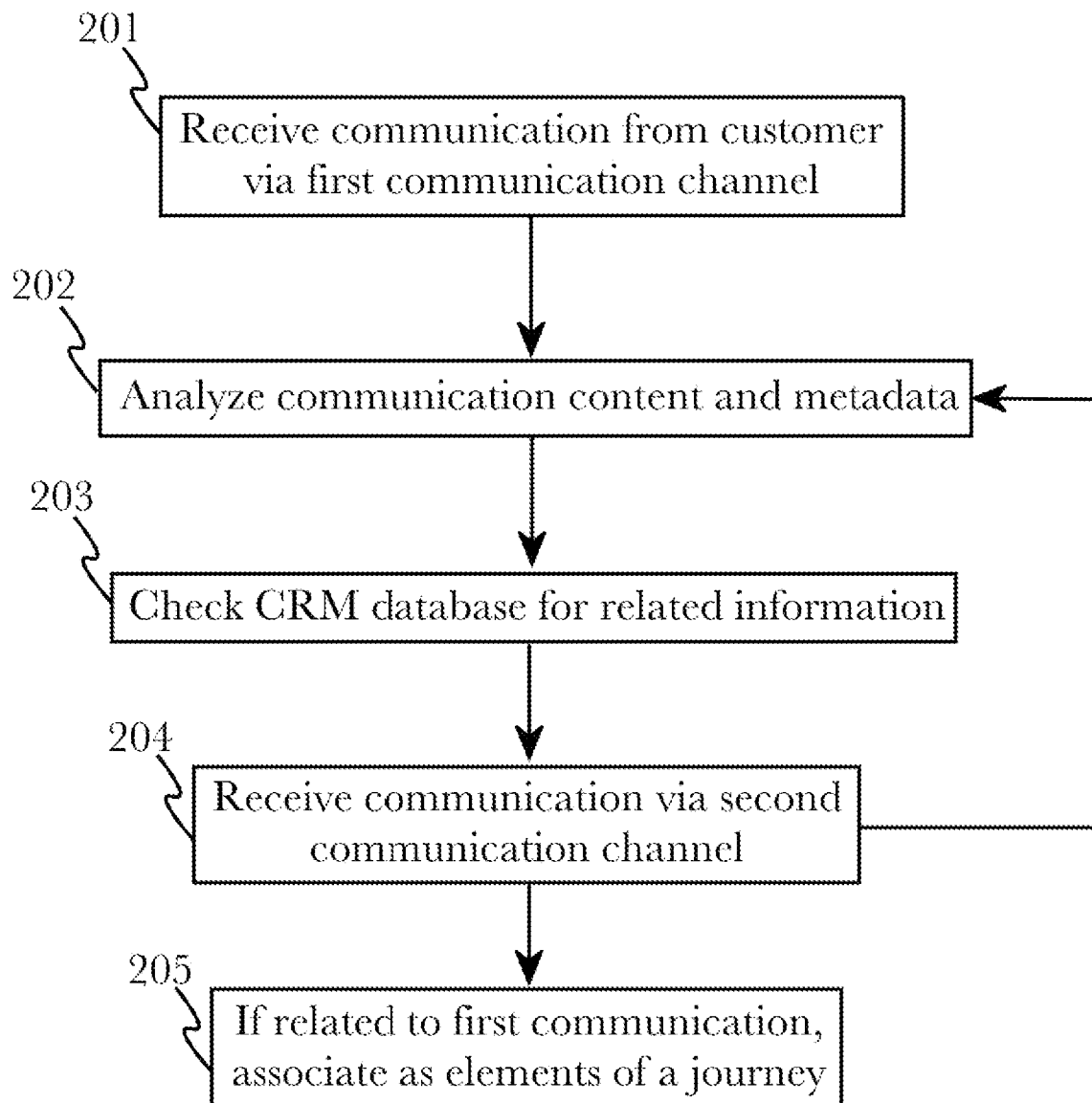
FIG. 2 is a flow diagram illustrating an exemplary method for automated multi-channel customer journey testing, illustrating a process for following a customer journey across multiple communication channels, according to a preferred embodiment of the invention.

FIG. 2 is a flow diagram illustrating an exemplary method 200 for automated multi-channel customer journey testing, illustrating a process for following a customer journey across multiple communication channels, according to a preferred embodiment of the invention. In an initial step 201, a journey tracking server 114 may receive communication from a customer via a first communication channel 113, such as an inbound telephone call or email, or any other communication type. In a next step 202 journey tracking server 114 may analyze the content (for example, the body text of an email or the conversation audio of a phone call) of the communication, as well as any available metadata such as source address (for example, a customer's phone number, email address, IP address, or other information identifying the source of the communication), timing information such as when the communication was placed or received, or information about a customer's device or the communication channel used such as IP addresses of email servers, hardware capabilities or SIM ID of a customer's mobile phone, customer geolocation information, or any other metadata that may be associated with or inferred from the communication received. In a next step 203, a CRM database 112 may be checked for related information based on the analysis, for example to retrieve a customer's account information or records of past interactions, and this retrieved data may be further analyzed to identify any additional information such as agents with whom the customer has interacted more than once, reports of recurring issues, customer preference as to communication channels, or other such insights.

When another communication is received via a second communication channel 204, whether it was inbound or outbound (that is, a response from a contact center agent 111b or a VA program 111a), this new communication may be analyzed 202 and used to look up additional information 203 in a CRM database 112. Operation may continue in this manner iteratively, performing data lookups and analyzing communications each time they are received. If it is determined that a new communication is related to the first communication (for example, through analysis and lookup operations that identify significant similarities between two communications), a logical association may be formed between the two communications in a final step 205, enabling them to be handled as a single customer journey that may span multiple interactions, communication channels, VA programs or human agents.

Figure 3:
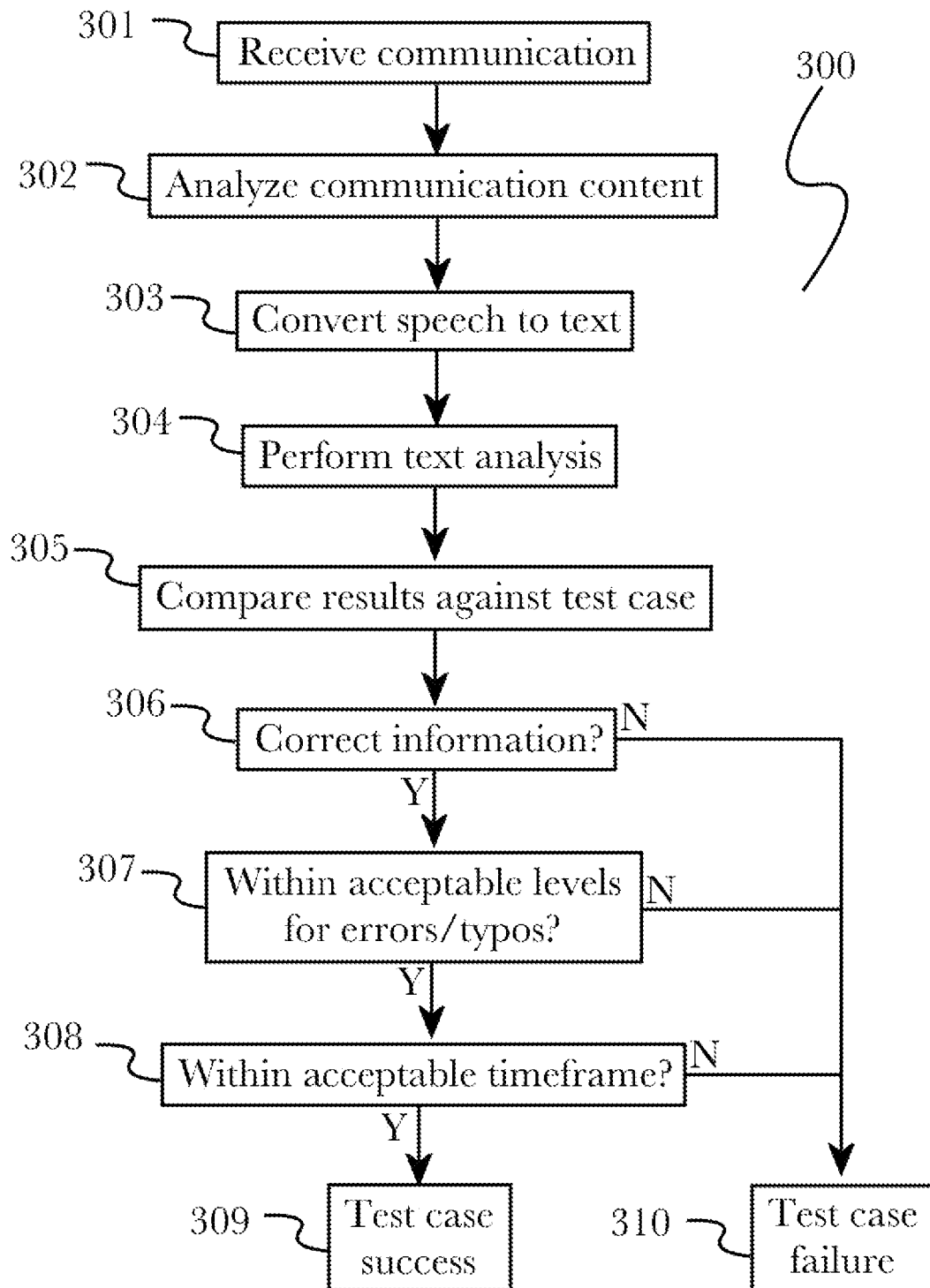
FIG. 3 is a flow diagram illustrating an exemplary method for automated multi-channel customer journey testing, illustrating a process for identifying and handling interaction content variances, according to a preferred embodiment of the invention.

FIG. 3 is a flow diagram illustrating an exemplary method 300 for automated multi-channel customer journey testing, illustrating a process for identifying and handling interaction content variances, according to a preferred embodiment of the invention. According to the embodiment, in a first step 301 a communication may be received at a journey tracking server 114, which may then in a next step 302 analyze the communication's content. A communication may be either inbound or outbound (that is, it may from a customer or from a contact center system or resource, such as a VA program 111a or agent 111b), and any particular communication may be a standalone message or notification or it may be part of a larger conversation or interaction. In this manner, constituent communications of an interaction may be individually analyzed for fine-grained control of a test case, while still retaining the logical connections between them to form interactions and journeys. During analysis of a communication, speech audio may be converted to text 303, and text (including any converted speech, when applicable) may be analyzed 304 to identify topics, keywords or phrases, check spelling and grammar, check for preferred vocabulary (or vocabulary to avoid), or other text analysis operations. The results of analysis may then be compared against a loaded test case configuration 305, to determine whether the test can be considered a success or failure. The analyzed content of the communication may be compared to expected results 306 to determine if any provided information is correct, the analyzed text may be compared against a plurality of acceptability thresholds 307 such as number of typographical errors or number of key vocabulary words or phrases that should be found (or a maximum number of keywords or phrases to be avoided), and the communication timing information may be checked 308 to determine if the communication was produced and delivered within an acceptable timeframe. If all comparisons pass, the test may be considered a success 309, but if any comparison returns a negative result (for example, if the number of typographical errors is above a tolerance threshold, or if the information presented does not match what was expected, as may be the case with a response to a structured query), then the test case is considered a failure 310. In this manner, a variety of analysis and comparison operations, and combinations thereof, may be used to provide flexible pass/fail checking that can accommodate natural language elements such as vocabulary variance and typographical mistakes, without providing false positive or negative results. This may be used to improve testing reliability when dealing with human agents or virtual assistants, allowing automated testing to be used in a wide variety of environments and configurations without compromising results.

Figure 4:
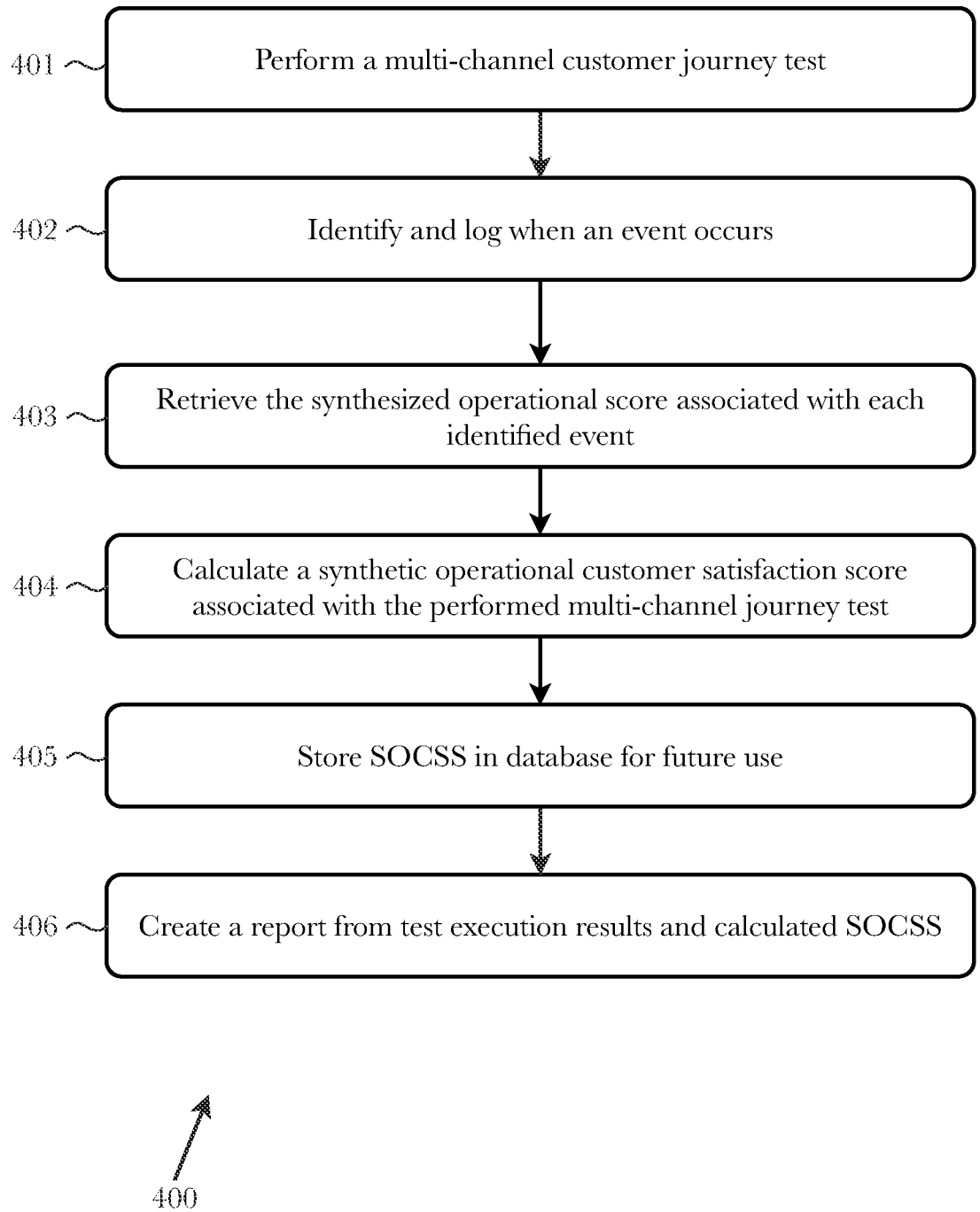
FIG. 4 is a flow diagram illustrating an exemplary method for calculating a synthetic operational customer satisfaction score associated with a test group of synthetic calls, according to an embodiment.

FIG. 4 is a flow diagram illustrating an exemplary method 400 for calculating a synthetic operational customer satisfaction score associated with a test group of synthetic calls, according to an embodiment. The process begins by performing a multi-channel customer journey test case 401 involving a plurality of synthetic calls which form a test group. The next step is to monitor the synthetic calls to identify when an event occurs and then log the event 402 into a database. When an event is identified, the type of event and a timestamp of when the event occurred may be logged into a database for future use. Next, the synthetic operational score associated with each identified and logged event may be retrieved 403 from event database 122. Once all synthesized operational scores have been retrieved, the next step is to calculate a synthetic operational customer satisfaction score (SOCSS) associated with the test group included in a customer journey test case 404. The SOCSS may be stored in a database for future use or further analysis and processing 405. As a last step, a customer journey test case report may be generated which may include the test execution results and the calculated SOCSS 406.

Figure 5:
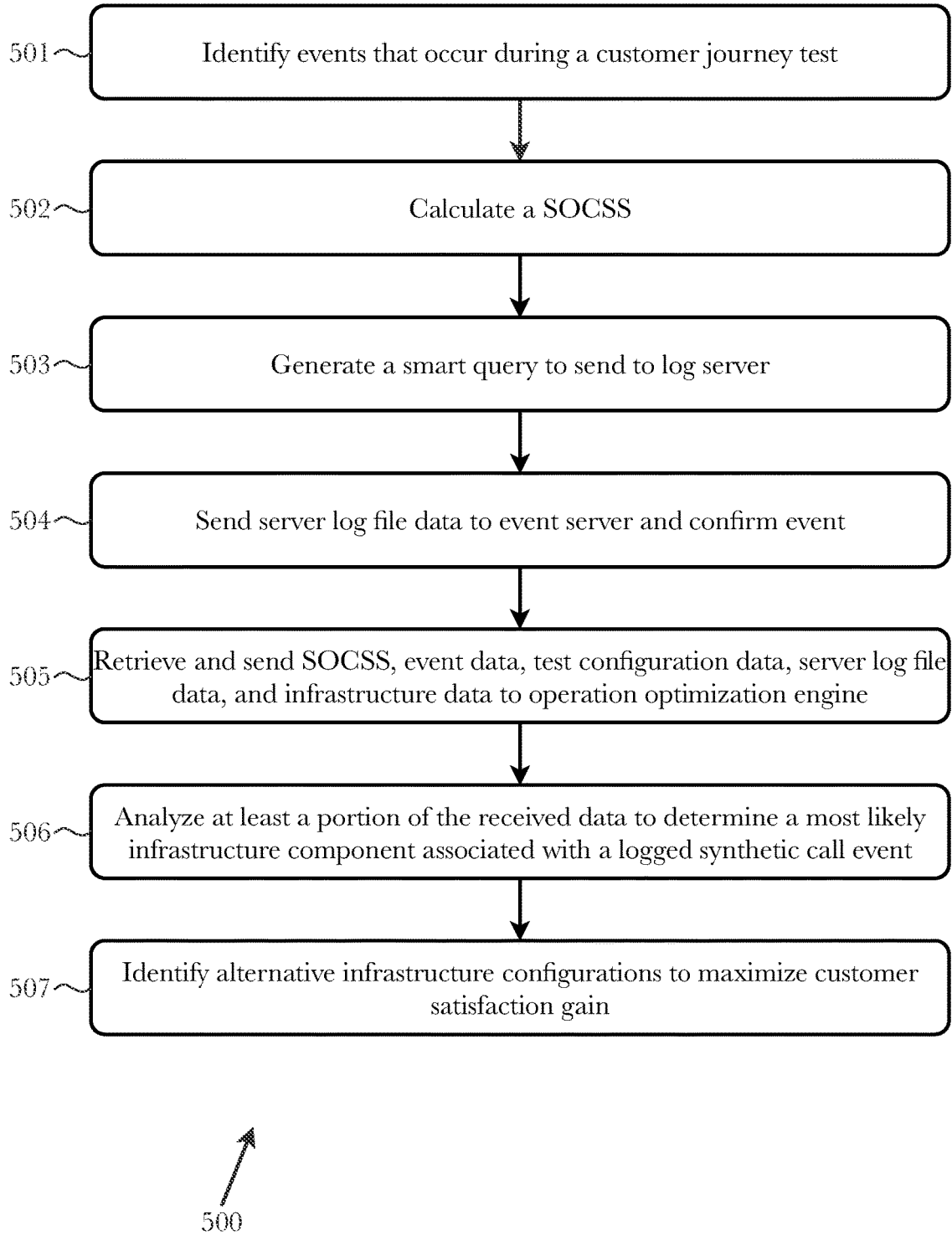
FIG. 5 is a flow diagram illustrating an exemplary method for determining infrastructure components that are most likely responsible for causing a synthetic call event, according to an embodiment.

FIG. 5 is a flow diagram illustrating an exemplary method 500 for determining infrastructure components that are most likely responsible for causing a synthetic call event, according to an embodiment. According to an embodiment, the process begins when an event server 121 identifies and logs events that occur during the synthetic call portion of a customer journey test case 501. The next step may involve calculating a synthetic operational customer satisfaction score 502 associated with a test group of synthetic calls. An event server 121 may then generate a smart query 503 to send to log server 123. The smart query may comprise at least an event type and a timestamp of when the event was logged by event server 121. Responsive to the received smart query, log server 123 may send a server log file to the event server 121 such that the event type included in the smart query may be confirmed 504 to have actually happened. Next, event server may retrieve and send 505 calculated SOCSS data, event data, test configuration data, server log file data, and infrastructure data to an operation optimization engine for further processing using one or more machine and deep learned algorithms. The one or more machine and deep learned algorithms may be utilized to analyze at least a portion of the received data to determine a most likely infrastructure component associated with a logged synthetic call event 506 and to identify alternative infrastructure configurations to maximize customer satisfaction gain 507.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
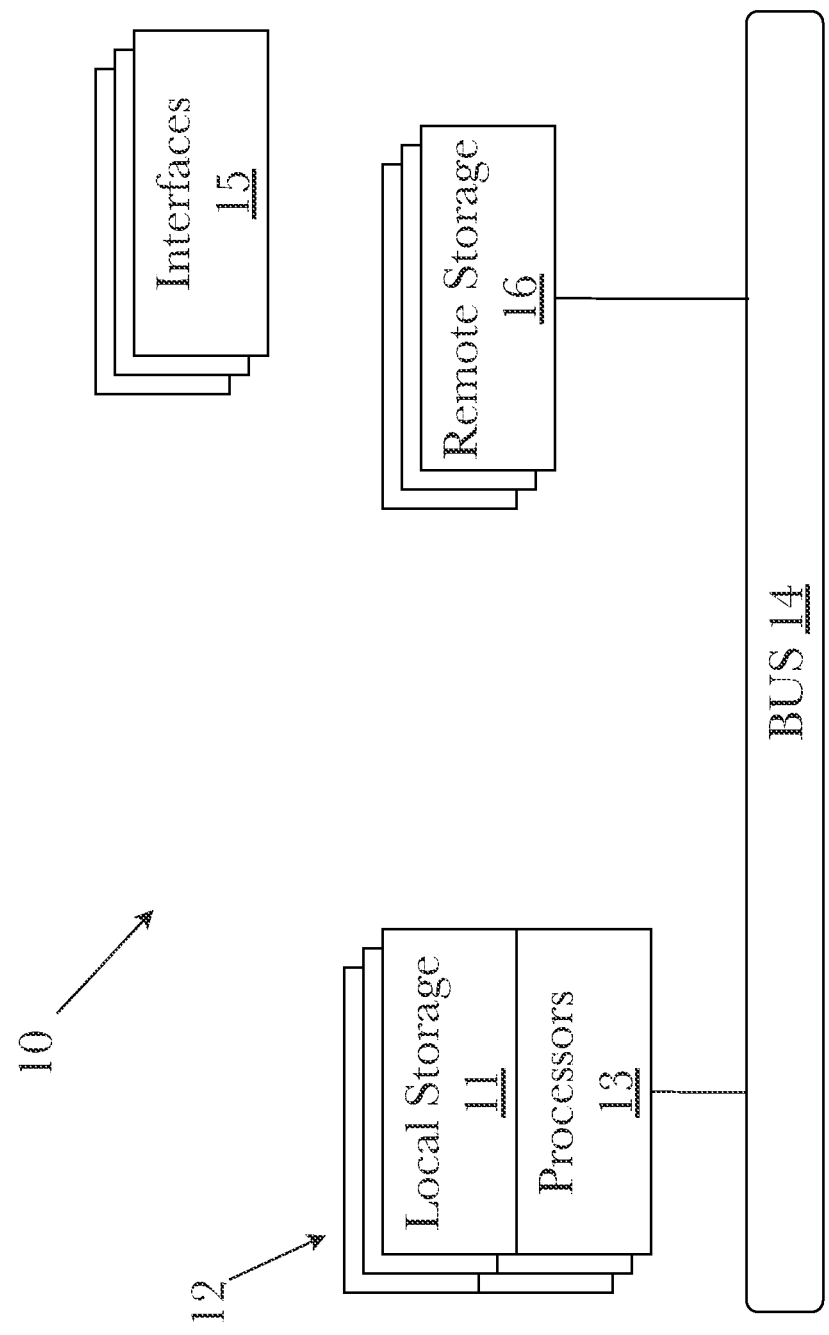
FIG. 6 is a block diagram illustrating an exemplary hardware architecture of a computing device used in an embodiment of the invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
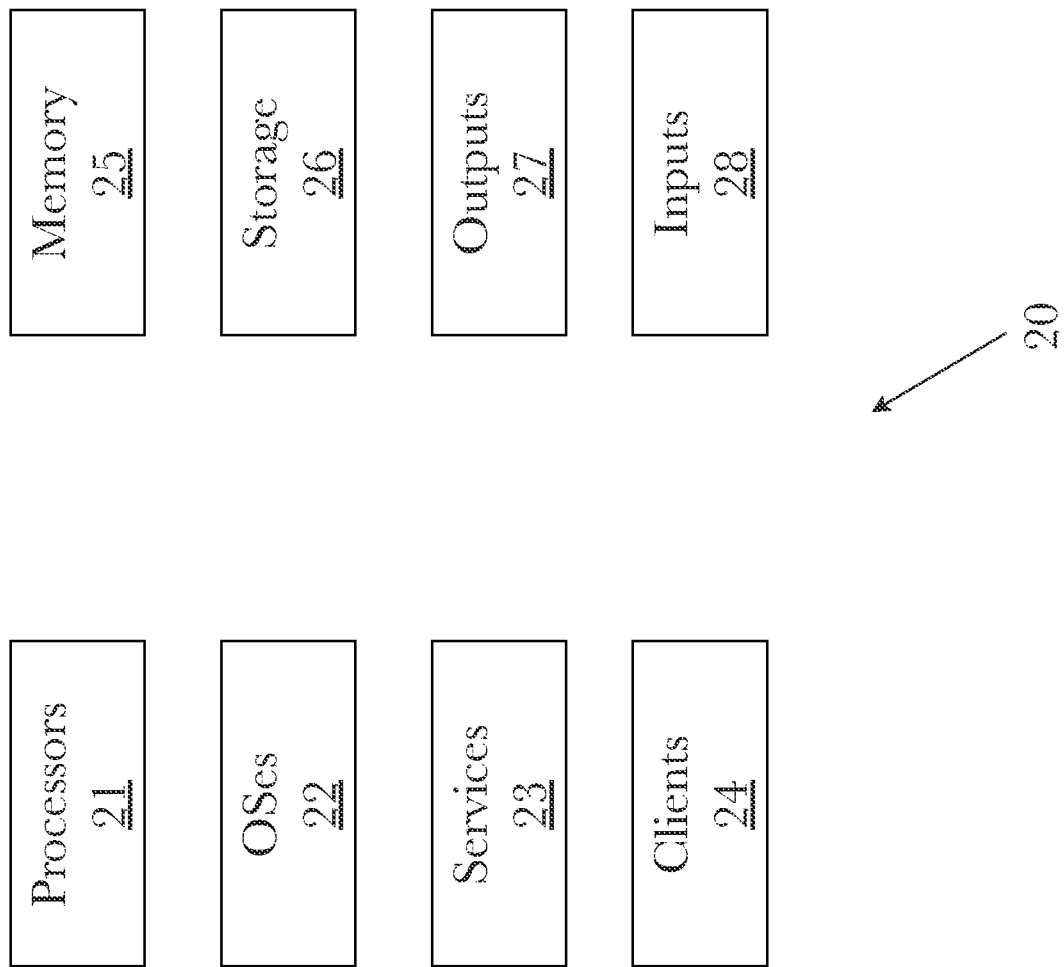
FIG. 7 is a block diagram illustrating an exemplary logical architecture for a client device, according to an embodiment of the invention.

In some embodiments, systems according to the present invention may be implemented on a standalone computing system. Referring now to FIG. 7, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21.

Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
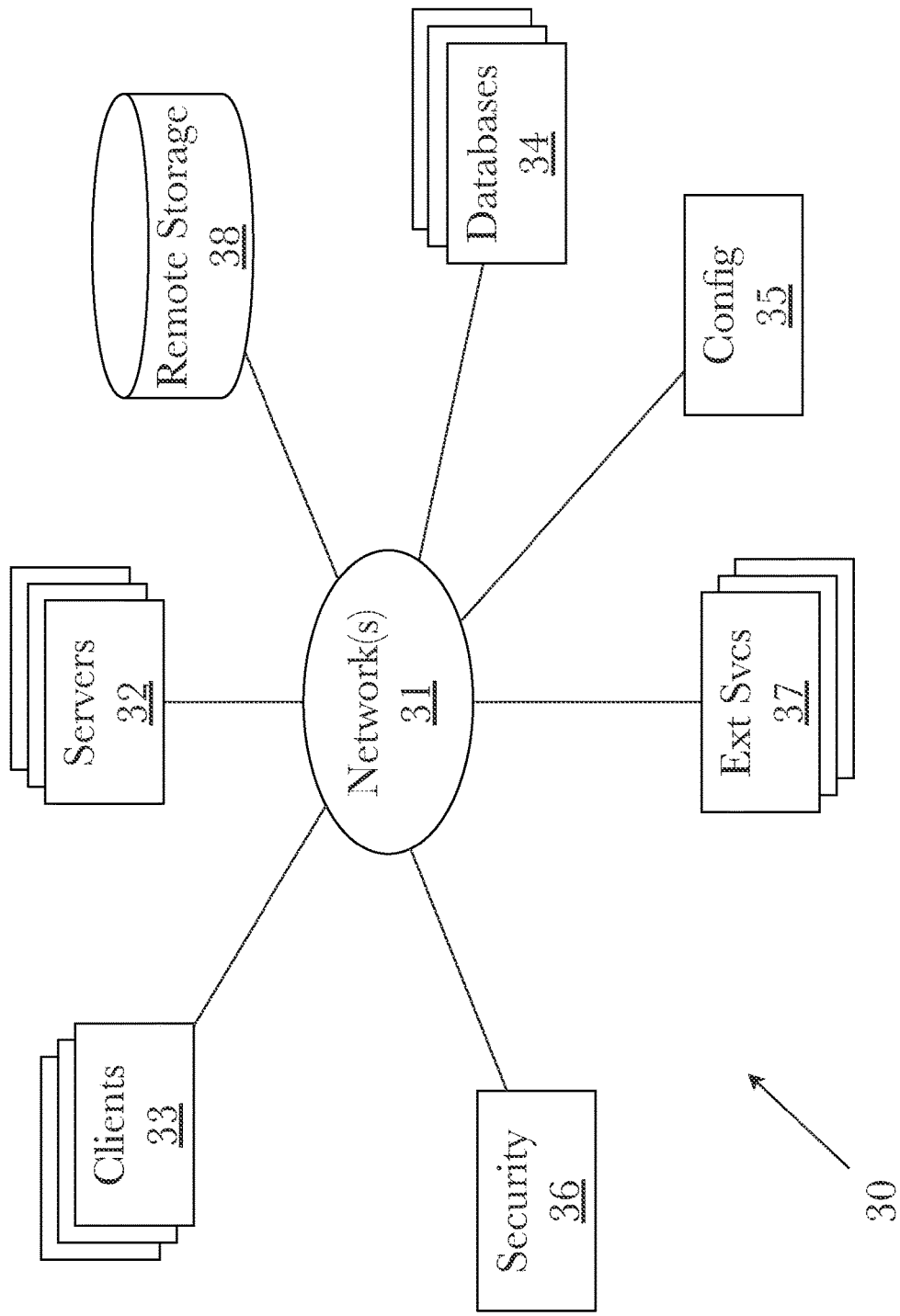
FIG. 8 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 8, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology 38 such as those referred to in the art as "NoSQL" (for example, HADOOP CAS- SANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 9:
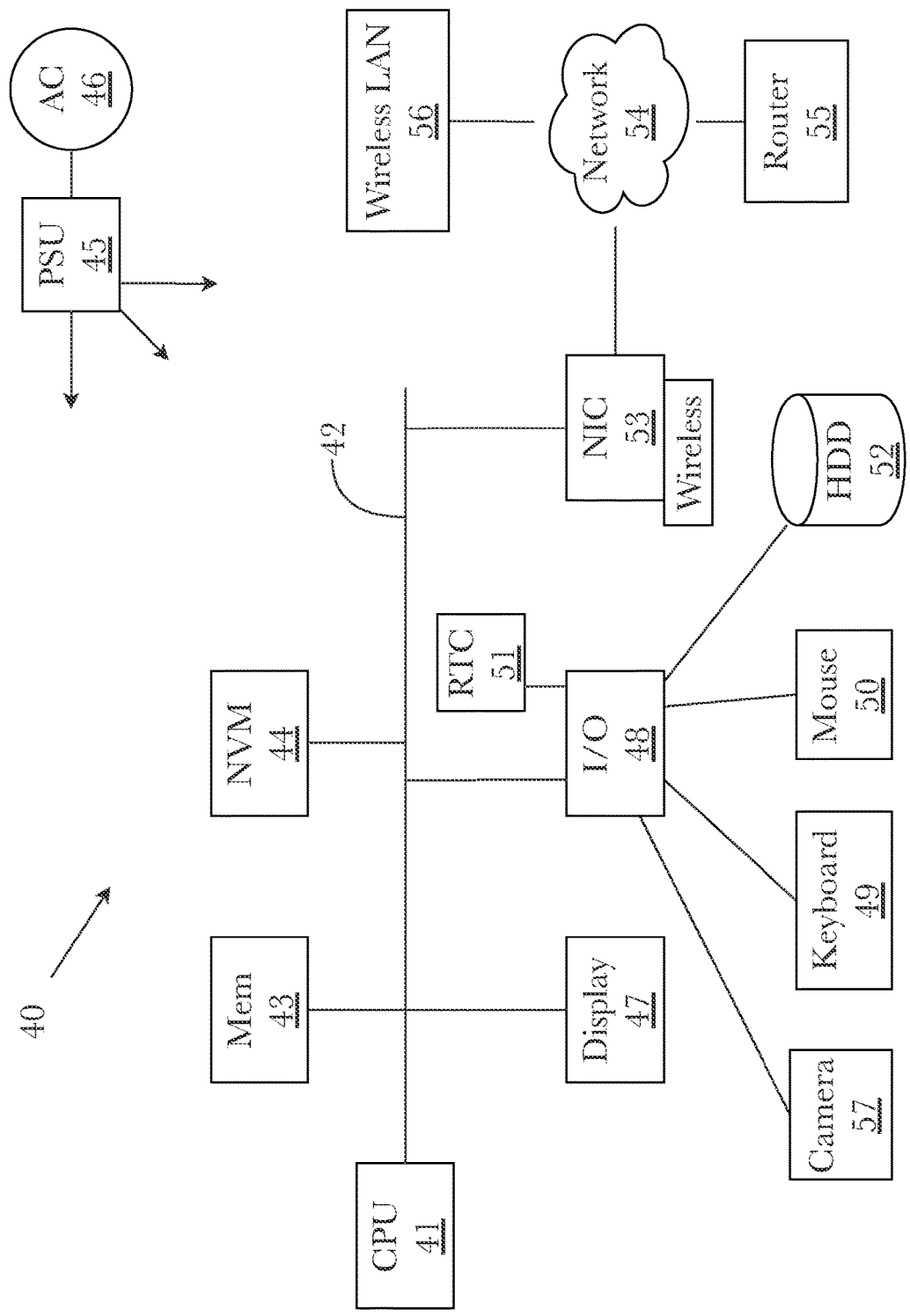
FIG. 9 is another block diagram illustrating an exemplary hardware architecture of a computing device used in various embodiments of the invention.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for autogenerated synthetic operational customer satisfaction scoring and analysis, comprising:
an event database comprising at least a processor, a memory, and a plurality of programming instructions stored in the memory and operating on the processor, wherein the programming instructions, when operating on the processor, cause the processor to:
store a plurality of events, each event comprising at least an event descriptor and a synthetic operational score; and
an infrastructure database comprising at least a processor, a memory, and a plurality of programming instructions stored in the memory and operating on the processor, wherein the programming instructions, when operating on the processor, cause the processor to:
store a plurality of infrastructure data comprising at least enterprise-specific infrastructure components and configurations, and historical infrastructure configuration information; and
a customer journey test management server comprising at least a processor, a memory, and a plurality of programming instructions stored in the memory and operating on the processor, wherein the programming instructions, when operating on the processor, cause the processor to:
retrieve a test case from the test database;
establish a test execution environment based on the test execution configuration of the test case;
execute the test script, according to the test execution configuration, within the test execution environment; and
transmit, according to the test execution configuration, a plurality of synthetic calls via a plurality of communication channels comprising at least a telephony network, wherein the plurality of synthetic calls comprise a test group; and
a customer journey event server comprising at least a processor, a memory, and a plurality of programming instructions stored in the memory and operating on the processor, wherein the programming instructions, when operating on the processor, cause the processor to:
monitor the synthetic calls that transmitted during the customer journey test case;
log an event that occurs during the synthetic call customer journey test case;
retrieve the synthetic operational score associated with the logged event from the event database;
aggregate the synthetic operational scores associated with a test group of customer journey test cases;
calculate a synthetic operational customer satisfaction score for the test group using the aggregated synthetic operational scores;
store the calculated synthetic operational customer satisfaction score in the event database; and
send the calculated synthetic operational customer satisfaction score to an operations optimization engine; and
an operations optimization engine comprising at least a processor, a memory, and a plurality of programming instructions stored in the memory and operating on the processor, wherein the programming instructions, when operating on the processor, cause the processor to:
receive a plurality of stored and third-party data comprising at least the calculated synthetic operational customer satisfaction score and infrastructure, event log, enterprise-specific customer satisfaction metrics, test case configuration, and log server information and use machine learning to:
analyze at least a portion of the received data to determine an infrastructure component which corresponds to a logged synthetic call event; and
suggest an alternative infrastructure configuration to maximize customer satisfaction gain.

2. The system of claim 1, wherein the communication channels comprise at least a voice over internet protocol.

3. The system of claim 1, wherein the machine learning comprises a classifier.

4. A method for autogenerated synthetic operational customer satisfaction scoring and analysis, comprising the steps of:
retrieving a test case from the test database;
establishing a test execution environment based on the test execution configuration of the test case;
executing the test script, according to the test execution configuration, within the test execution environment; and
transmitting, according to the test execution configuration, a plurality of synthetic calls via a plurality of communication channels comprising at least a telephony network, wherein the plurality of synthetic calls comprise a test group;
monitoring the synthetic calls that transmitted during the customer journey test case;
logging an event that occurs during the synthetic call customer journey test case;
retrieving the synthetic operational score associated with the logged event from the event database;
aggregating the synthetic operational scores associated with a test group of customer journey test cases;
calculating a synthetic operational customer satisfaction score for the test group using the aggregated synthetic operational scores;
storing the calculated synthetic operational customer satisfaction score in the event database; and
sending the calculated synthetic operational customer satisfaction score to an operations optimization engine;
analyzing at least a portion of the received data to determine an infrastructure component which corresponds to a logged synthetic call event; and
suggesting an alternative infrastructure configuration to maximize customer satisfaction gain.

5. The method of claim 3, wherein the communication channels comprise at least a voice over internet protocol.

6. The method of claim 3, wherein the machine learning comprises a classifier.

* * * * *